Oct. 14, 1952 J. A. VOLK 2,614,228
SYSTEM OF SEISMOGRAPHIC VISUAL RECORDING
Filed Oct. 5, 1949
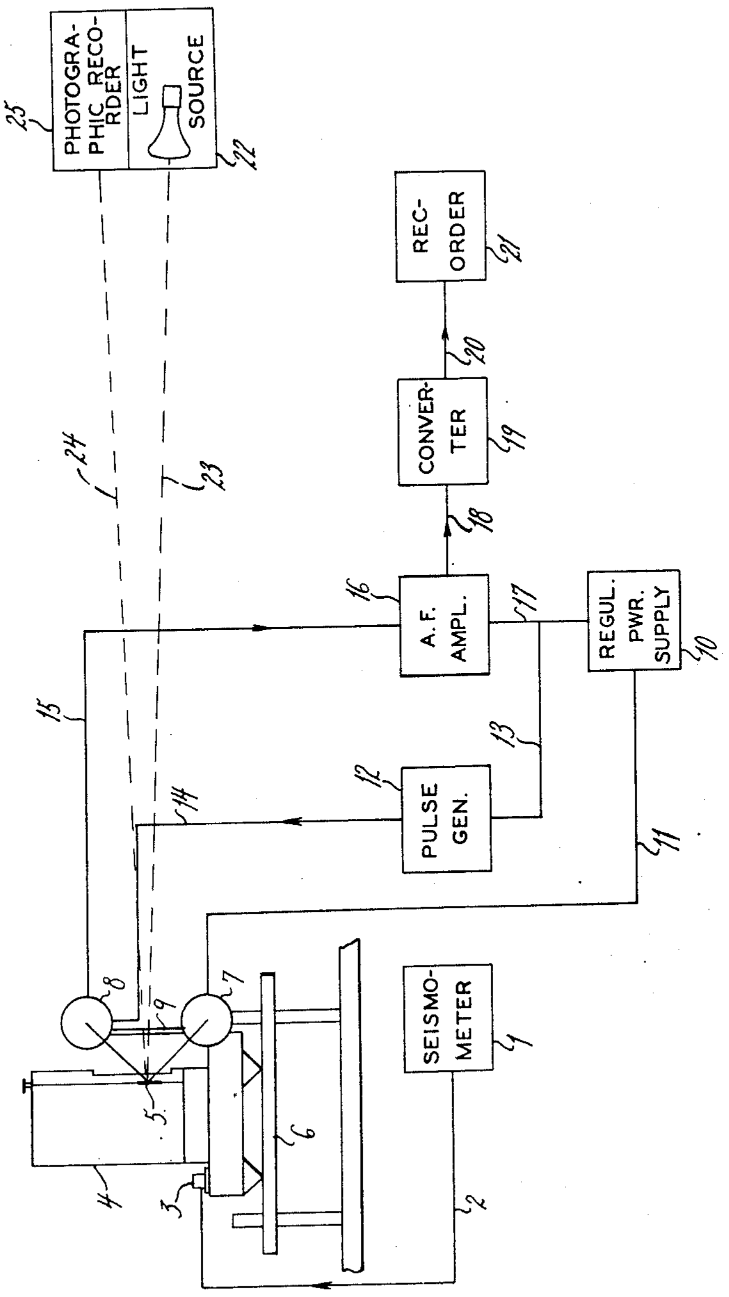
INVENTOR
JOSEPH A. VOLK
BY [signature]
ATTORNEY Patented Oct. 14, 1952 2,614,228

UNITED STATES PATENT OFFICE 2,614,228

SYSTEM OF SEISMOGRAPHIC VISUAL RECORDING

Joseph A. Volk, Normandy, Mo.

Application October 5, 1949, Serial No. 119,696

1 Claim. (Cl. 250—214)

This invention relates to a system of seismographic visual recording, and has for one of its objects to reproduce a seismic record at a point which is not limited in distance from the seismometer. Another important object is to produce a seismographic system which may be utilized in conjunction with the present photographic method of seismographic recording.

Another important object of the invention is to pulse the photoelectric cell excitation potential. This method of excitation eliminates the use of a D. C. amplifier. Still another and very important object is to replace the D. C. amplifier with a standard audio frequency amplifier, which provides greater stabilization of the gain of amplification and also a simplification in design and structure of the amplifier.

A still further object of the invention is to convert the pulses modulated by the photocell and sufficiently amplified by the audio frequency amplifier into a D. C. component directly proportionate to the modulated light beam falling upon the photocell.

The drawing is a diagrammatic illustration of the system.

The invention comprises a seismometer 1 electrically connected by wires 2 to the galvanometer terminal 3. The galvanometer 4 which I employ is a mirror galvanometer, the mirror being shown at 5. The galvanometer is supported by a platform 6. Also supported upon the platform 6 is an exciter lamp 7 and a photoelectric cell 8, the exciter lamp and photoelectric cell being mechanically connected as shown at 9. The regulated power supply 10 energizes the exciter lamp 7 through wires 11, the pulse generator 12 through wires 13, and the A. F. amplifier through wires 17.

The photoelectric cell 8 is provided with a light modulator therein (not shown) for modulating the intensity of the light beam projected upon the photoelectric cell 8.

The pulses from pulse generator 12 are applied by wires 14 to the photoelectric cell 8, and through it are sent over wires 15, in the fashion in which they have been modulated by photoelectric cell 8, to A. F. amplifier 16, where the modulated A. C. components of these pulses are amplified and then sent through wires 18 to a converter 19 which rectifies the A. C. components and converts them into D. C. components directly proportionate to the modulation function of the photoelectric cell 8.

The standard method of recording seismographic impulses is indicated by light source 22, the light ray therefrom, indicated by dotted line 23, striking mirror 5 and being reflected therefrom, as shown by dotted line 24, to the photographic recorder 25.

My new system may be employed in conjunction with standard seismographic apparatus now generally employed.

I claim:

A system of seismographic visual recording comprising a seismometer operatively connected with a galvanometer having a mirror located therein, an exciter lamp for projecting a ray of light upon said mirror to be deflected thereby to a photoelectric cell, a pulse generator for supplying a pulsed current to said photoelectric cell, an audio frequency amplifier for receiving the modulated pulsed current from the photoelectric cell, a converter for receiving said modulated pulsed current from said amplifier for rectifying said current from A. C. to D. C., said pulse generator, exciter lamp, photoelectric cell, and audio frequency amplifier and converter being electrically connected with a regulated power supply, and means for transmitting the amplified modulated A. C. components to said converter, the rectification of the A. C. components into D. C. components being directly proportionate to the modulated light beam falling upon the photoelectric cell.

JOSEPH A. VOLK.

REFERENCES CITED

The following references are of record in the file of this patent:

UNITED STATES PATENTS

| Number | Name | Date |
|---|---|---|
| 2,095,717 | Shore et al. | Oct. 12, 1937 |
| 2,202,060 | Mitchell | May 28, 1940 |
| 2,309,560 | Welty | Jan. 26, 1943 |
| 2,410,550 | Padva | Nov. 5, 1946 |
| 2,470,846 | DeBoisblanc | May 24, 1949 |